United States Patent [19]

Bridgeman

[11] Patent Number: 4,858,584
[45] Date of Patent: Aug. 22, 1989

[54] HEAT EXCHANGER

[76] Inventor: Gordon Bridgeman, 230 Gibbs Road, East, Kelowna, British Columbia, Canada, V1X 2V9

[21] Appl. No.: 249,675

[22] Filed: Sep. 27, 1988

[51] Int. Cl.⁴ .......................................... F02M 31/10
[52] U.S. Cl. .................................... 123/557; 165/163
[58] Field of Search ................ 123/557, 547; 165/163, 165/159

[56] References Cited

U.S. PATENT DOCUMENTS

| | | | |
|---|---|---|---|
| 1,926,342 | 9/1933 | Lippencott | 165/163 |
| 3,253,647 | 5/1966 | Deshaies | 123/557 X |
| 4,326,491 | 4/1982 | Burchett | 123/557 |
| 4,347,894 | 9/1982 | Gerlach | 165/163 X |
| 4,349,950 | 9/1982 | Bowden | 165/163 X |
| 4,401,091 | 8/1983 | Costello et al. | 123/557 |

Primary Examiner—Willis R. Wolfe
Assistant Examiner—M. Macy
Attorney, Agent, or Firm—Murray E. Thrift; Stanley G. Ade; Adrian D. Battison

[57] ABSTRACT

A fuel pre-heater is used for heating the fuel for internal combustion engines, especially diesel engines. The pre-heater has an elongate cylindrical outer container housing an inner, concentric tube so as to provide an annular chamber between the two. A fuel tube, formed into a coil extends the length of the annular chamber, with its inlet and outlet exiting through the ends of the container. Heating medium inlet and outlet nipples for the container are arranged tangentially, at opposites ends of the container and oriented in opposite directions. The heating medium inlet and outlet are connected into the coolant system of the internal combustion engine while the fuel inlet and outlet are connected into the fuel line leading to the fuel injectors or carburetor of the engine. The pre-heater produces with its long path and counter-flow pattern highly efficient heat transfer from the cooling medium to the fuel.

5 Claims, 2 Drawing Sheets

HEAT EXCHANGER

FIELD OF THE INVENTION

The present invention relates to a heat exchanger for pre-heating fuel with a heated liquid.

BACKGROUND

Cold ambient temperatures frequently cause problems in the operation of internal combustion engines, especially diesel engines. It is known that pre-heating the fuel for such an engine, either before carburetion or injection, is useful in improving operation and engine fuel economy. Various fuel pre-heaters for pre-heating fuel using hot coolant from the engine cooling system have been proposed. In general, a fuel heat exchanger of this type could be of various designs, however size and weight have become a restrictive factor in the engine compartments of the newer vehicles. It therefore becomes important to reduce these physical parameters and to improve the efficiency of the heat transfer in such a unit. The present invention aims at such improvements.

SUMMARY

According to the present invention, there is provided a fuel pre-heater comprising:

a container with a cylindrical outer wall and closed ends;

an inner cylindrical wall extending from end to end of the container, concentrically therein to provide an annular chamber within the container;

a tube formed into a helical coil located between the inner and outer walls, with ends of the tube extending through the container to the exterior thereof, adjacent opposite ends of the container; and inlet and outlet fittings connected to the cylindrical outer wall, to open in opposite tangential directions into the annular chamber adjacent opposite ends thereof.

In preferred embodiments, the ends of the coil extend through the end walls of the container and the spacing between the coil and the inner and outer walls is kept to a minimum. Fuel is passed through the coil in counter flow to hot engine coolant passing through the annular chamber between the inner and outer walls.

A fuel heat exchanger so constructed has a number of significant characteristics. The tangential inlet and outlet for heating medium cause the heating medium to flow helically through the annular chamber to provide the maximum length of heat transfer path. This provides the highest possible log mean temperature difference. The fuel outlet temperatures have been found to approach the inlet temperatures of the heating medium to within 15° F. (8.3° C.), which compares favourably with the 35° F. (19.4° C.) temperature difference observed with axial heat medium connections.

The inner wall forces the heating medium into the annular spacing to maximize contact between the heating medium and the fuel coil. By minimizing the clearance between the coil and the inner and outer walls, the flow is forced into a helical flow pattern inhibiting axial flow along the walls. In addition, the thin film of heating medium thus produced has been found to transfer its heat content more readily than a thicker film. The thin film flow also has a high velocity that is expected to retain solids in suspension, thus minimizing sediment build-up in the heat exchanger.

BRIEF DESCRIPTION OF THE DRAWINGS

In the accompanying drawings, which illustrate an exemplary embodiment of the present invention.

DETAILED DESCRIPTION

Figure 1:
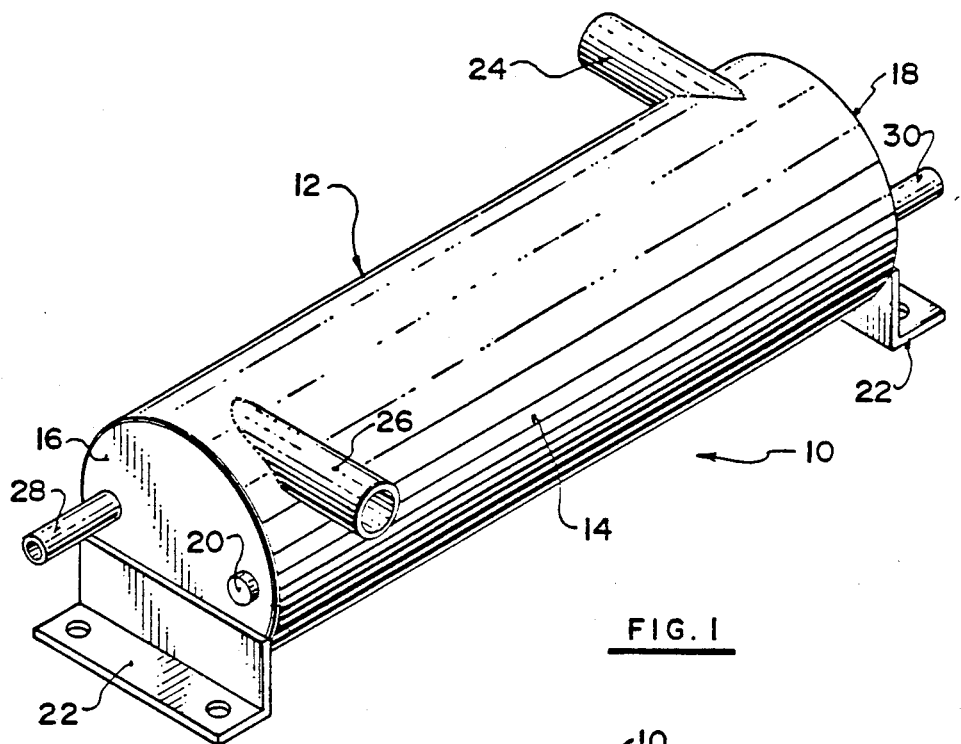
FIG. 1 is an isometric view of a fuel heat exchanger according to the present invention.
Figure 2:
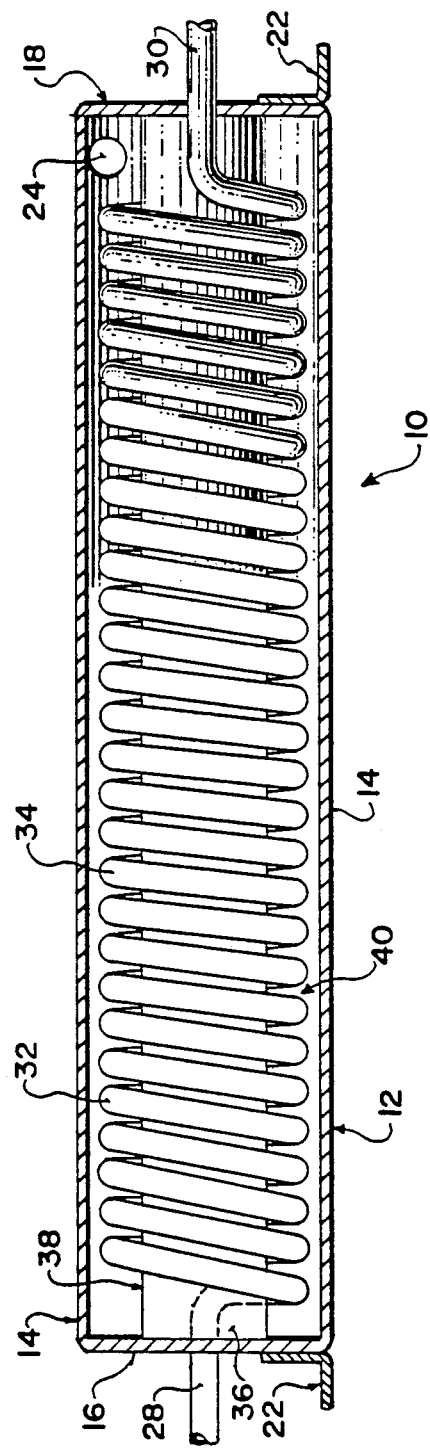
FIG. 2 is a side elevation with the outer wall shown in section of the heat exchanger in FIG. 1.

Referring to the accompanying drawings, and particularly to FIGS. 1 and 2, there is illustrated a heat exchanger 10 that is housed within a container 12 defined by a cylindrical outer wall 14 and two circular ends walls 16 and 18. The end wall 16 has a clean out and bleed opening closed by a plug 20. Two mounting brackets 22 of L-shape are mounted on the respective ends 16 and 18. The cylindrical outer wall 14 of the container 12 is fitted with tangential inlet and outlet nipples 24 and 26 respectively. The inlet nipple 24 is located adjacent the end 18, while the outlet nipple 26 is located adjacent the end 16. The two nipples project in opposite tangential directions from the container.

A fuel inlet tube 28 projects through the end 16 of the container 12, adjacent the periphery of the wall, while a fuel outlet 30 projects through the end 18, also adjacent the periphery of that wall. The inlet and outlet 28 and 30 are the opposite ends of a fuel tube 32 that is formed into a coil 34 inside the container 12. The coil 34 surrounds an inner, concentric tube 36 that extends between the ends 16 and 18 of the container 12, concentrically with the cylindrical outer wall 14. The tube 36 defines an inner wall 38 of an annular chamber 40 between the inner and outer walls 38 and 14 respectively.

In use, fuel is supplied to the fuel inlet 28 to flow internally through the helical coil 34 to the fuel outlet 30. A heating medium such as engine coolant, is supplied to the annular chamber 40 through the tangential inlet 24. The tangential flow is confined in the annular chamber 40 and is caused by the helical coil 34 to flow in a helical path, following the coil to the outlet 26 at the opposite end of the heat exchanger. The flow of the heating medium and that of the fuel in the coil 34 are in counterflow, and have been found to be very efficient with respect to its heat transfer. The presently preferred diameter of the fuel tube 32 forming the coil 34 is about one-half the radial distance between the inner wall 38 and the outer wall 14. This promotes the helical flow of the heating medium in the annular chamber and inhibits the flow of heating medium along the inner or outer walls directly from the inlet to the outlet.

Figure 3:
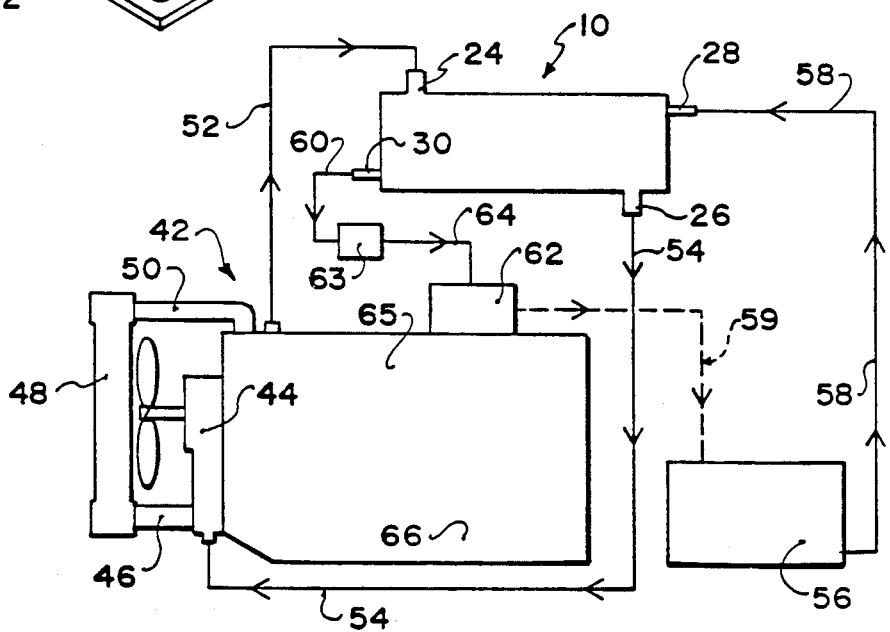
FIG. 3, found on the same strut as FIG. 1, is a schematic view of the connections of the heat exchanger to an internal combustion engine.

FIG. 3 illustrates the use of the heat exchanger in connection with an internal combustion engine 42. The engine has a coolant pump 44 that pumps the engine coolant from the radiator 48 through a line 46 to the low water jacket 66 of the engine 42. A line 50 allows hot engine coolant to flow from the high water jacket 65 to the top of the radiator 48 when the engine thermostat is in the open position. A hot coolant line 52 leads from the high water jacket 65 of the engine 42 to the heating medium inlet 24 of the heat exchanger 10. A second coolant return line 54 leads from the outlet 26 of the heat exchanger 10 to the suction side of the water pump 44. A fuel tank 56 is connected to a fuel line 58 leading to the fuel inlet 28 of the heat exchanger 10, while a further fuel line 60 leads the heated fuel from the heat exchanger 10 to a fuel filter 63. From the fuel filter 63 a fuel line 64 leads the heated fuel to a schematically illustrated fuel atomizing device 62 of the engine 42 which may be a carburetor or a set of fuel injectors. The heat exchanger 10 may also be installed after the fuel filter 63 and before the atomizing device 62. A return line 59 from the atomizing device to the fuel tank 56 supplies excess warm fuel to the fuel tank to prevent gelling in cold weather.

In the foregoing, a single embodiment of the present invention has been described. It is to be understood however, that other embodiments are possible within the scope of the invention, and that the invention is to be considered limited solely by the scope of the appended claims.

I claim:

1. A fuel pre-heater comprising:
   a container with a cylindrical outer wall and closed ends;
   an inner cylindrical wall extending from end to end of the container, concentrically therein to provide an annular chamber within the container;
   a tube formed into a helical coil located between the inner and outer walls, with ends of the tube extending through the container to the exterior thereof, adjacent opposite ends of the container; and
   inlet and outlet fittings connected to the cylindrical outer wall, to open in opposite tangential directions into the annular chamber adjacent opposite ends thereof.

2. A pre-heater according to claim 1 wherein the coil is located substantially midway between the inner and outer walls.

3. A pre-heater according to claim 1 wherein the diameter of the tube is substantially one-half the radial distance between the inner and outer walls.

4. A pre-heater according to claim 1 wherein the ends of the coil project through the ends of the container.

5. A pre-heater according to claim 1 wherein the coil is wound to intercept fluid flowing tangentially into the inlet fitting and to direct the flow into a helical path leading towards the outlet.

* * * * *